United States Patent [19]

Solenberger et al.

[11] 4,341,605

[45] Jul. 27, 1982

[54] PROCESS FOR CATION PERMEABLE MEMBRANE WITH REINFORCEMENT FABRIC EMBEDDED THEREIN AND PRODUCT THEREOF

[75] Inventors: John C. Solenberger, Mt. Prospect, Ill.; Michael S. Withers, Landenberg, Pa.

[73] Assignee: E. I. Du Pont de Nemours and Company, Wilmington, Del.

[21] Appl. No.: 225,640

[22] Filed: Jan. 16, 1981

[51] Int. Cl.$^3$ .................. C25B 1/34; C25B 13/02; C25B 13/08
[52] U.S. Cl. .................. 204/98; 204/128; 204/252; 204/296
[58] Field of Search .......... 204/98, 128, 296, 252, 204/263, 266

[56] References Cited

U.S. PATENT DOCUMENTS

| | | | |
|---|---|---|---|
| 3,004,904 | 10/1961 | Gregor et al. | 204/180 |
| 3,371,785 | 3/1968 | Hanami | 210/65 |
| 3,494,468 | 2/1970 | Kohl | 210/321 |
| 3,616,121 | 10/1971 | Freundlich | 161/44 |
| 3,770,567 | 11/1973 | Grot | 161/189 |
| 3,849,243 | 11/1974 | Grot | 161/189 |
| 3,902,947 | 9/1975 | Grot | 156/213 |
| 3,925,135 | 12/1975 | Grot | 156/213 |
| 3,985,501 | 10/1976 | Grot | 8/115.5 |

Primary Examiner—R. L. Andrews

[57] ABSTRACT

A cation permeable membrane containing areas of thin wall construction comprises a cation exchange polymer matrix having a reinforcement fabric embedded therein.

A two-step lamination procedure is described where holes are formed in a film of laminated polymer prior to a second lamination step.

The cation permeable membrane has utility in membrane ion exchange, reverse osmosis devices or in electrolytic cells such as chlor-alkali cells.

32 Claims, No Drawings

4,341,605

PROCESS FOR CATION PERMEABLE MEMBRANE WITH REINFORCEMENT FABRIC EMBEDDED THEREIN AND PRODUCT THEREOF

BACKGROUND OF THE INVENTION

The present invention relates to a reinforced cation permeable polymeric membrane, which for support and strength contains a reinforcement fabric embedded therein, and to a process of formation.

Polymeric cation permeable films, also called membranes, are known and have utility in membrane ion exchanger, reverse osmosis devices and electrolytic cells such as chlor-alkali cells for the manufacture of chlorine, caustic soda and hydrogen. For commercial use, these films are generally reinforced with a fabric to impart strength.

U.S. Pat. Nos. 3,770,567; 3,849,243; 3,902,947 and 3,925,135 are directed to reinforced cation permeable membranes and methods of manufacture in which a support material is embedded in the membrane.

In these patents various embodiments initially employing a film containing a first polymer layer with sulfonyl groups present as cation exchange groups and a second polymer layer with sulfonyl groups present as $-SO_2M$ wherein M represents a halogen atom are disclosed. These latter sulfonyl groups do not function for ion exchange. Thereafter a support material, e.g., a reinforcement fabric, is laminated under vacuum conditions to the polymer layer containing sulfonyl groups present as $-SO_2M$ whereby the support material is embedded in this polymer layer.

After embedment of the support material, cation permeability is introduced across the thickness of the film by conversion of sulfonyl groups present as $-SO_2M$ into cation exchange groups. Examples of cation exchange groups include $-(SO_2NH_2)_mQ$ or $-(SO_3)_nMe$ wherein Q is H, cation of an alkali metal or cation of an alkaline earth metal and m is the valence of Q and Me is a metallic cation and n is the valence of Me.

In U.S. Pat. Nos. 3,770,567; 3,849,243; 3,902,947 and 3,925,135, the thickness of reinforcement fabric controls the minimum thickness of the membrane since the fabric is laminated to and embedded in a layer of polymer. Some fibers of the reinforcement fabric are near to the surface of the membrane.

SUMMARY OF THE INVENTION

The present invention is directed to a process of formation of a reinforced membrane, suitable for conversion to a cation exchange membrane, in which the following steps are employed:

(a) laminating at a temperature from 150° C. to about 350° C. first surfaces of both a first film and a reinforcement fabric, whereby said reinforcement fabric contacts a support material and during laminating a portion of the first surface of the first film contacts said support material, said film comprising a fluorine containing polymer with pendant side chains comprising sulfonyl groups present as $-SO_2F$ or $-SO_2Cl$, or carboxyl groups present as $-COOR$ where R is lower alkyl, each of said sulfonyl or carboxyl groups attached to a carbon atom which has at least one fluorine atom connected thereto;

(b) separating said first film from said support material whereby a laminate is obtained with holes in an area at least 5 percent of an overall surface area of said first film;

(c) laminating at a temperature from about 150° C. to about 350° C. a second film to both (i) the first surface of the first film and (ii) a second surface of said reinforcing fabric, causing embedment of said fabric and causing formation of a membrane substantially free of holes, said second film comprising a fluorine-containing polymer with pendant side chains comprising sulfonyl groups present as $-SO_2F$ or $-SO_2Cl$, or carboxyl groups present as $-COOR$ where R is lower alkyl, each of said sulfonyl or carboxyl groups attached to a carbon atom which has at least one fluorine atom connected thereto.

The present invention also relates to a reinforced cation permeable membrane substantially free of holes with areas of thin wall construction, said membrane comprising a matrix of at least one fluorine-containing polymer having pendant side chains comprising sulfonyl groups or carboxyl groups present as ion exchange groups, with a reinforcement fabric embedded in the matrix, each of said sulfonyl groups or carboxyl groups being attached to a carbon atom having at least one fluorine atom connected thereto. A preferred membrane has a greater thickness of polymer in portions of the membrane where individual reinforcement fiber is present in comparison to areas where no reinforcement fiber exists.

As employed herein, the term "embedded" is used to mean that the reinforcement fabric is substantially covered by the matrix of fluorine-containing polymer, except that the fabric may not be so covered at some of the crossover points of the fibers in the fabric, where the fabric has a greater thickness.

DETAILED DESCRIPTION OF THE INVENTION

The present invention relates to a cation permeable membrane containing a reinforcement fabric. The membrane has thin wall portions where no reinforcement fibers are present and thicker wall portions where reinforcement fiber adds bulk to the membrane.

The process of making the membrane with a reinforcement material embedded therein uses a two-step lamination procedure. In a first step an intermediate polymer and a reinforcement fabric are laminated with partial embedment of the fabric. Prior to a second lamination step, holes are formed in the polymer film which partially encapsulates the fabric. In the second lamination step, a second polymer film serves both to complete embedment of the reinforcement fabric and to cover substantially all of the holes in the first film.

One polymer suitable for use in the membrane initially comprises an intermediate fluorine-containing polymer with pendant side chains comprising sulfonyl groups present as $-SO_2F$ or $-SO_2Cl$, preferably $-SO_2F$, wherein each of said sulfonyl groups is attached to a carbon atom which has at least one fluorine atom connected thereto. This type of polymer is thermoplastic, i.e., it softens at elevated temperatures and allows a reinforcement material to be laminated and embedded within this polymer. Suitable intermediate polymers include those made from at least two classes of monomers. A first class includes vinyl fluoride, hexafluoropropylene, vinylidene fluoride, trifluoroethylene, chlorotrifluoroethylene, perfluoro(alkyl vinyl ether), tetrafluoroethylene and mixtures thereof. For a preferred mode of vinyl monomer will not contain hydrogen since the presence of hydrogen results in decreased chemical stability of the polymer. A second class of monomers for preparation of the copolymer contains the precursor —SO₂F or —SO₂Cl, preferably —SO₂F. Examples of such monomers include $CF_2=CFR_fSO_2F$, wherein $R_f$ is a bifunctional perfluorinated radical (which can contain ether linkages) comprising 2 to 8 carbon atoms. Generally, the sulfonyl group in the polymer chain will be attached to a carbon atom which has at least one fluorine atom attached thereto. If the sulfonyl group is attached directly to the polymer chain, the carbon in the chain to which it is attached will have a fluorine atom attached thereto. A preferred intermediate polymer is perfluorinated; an example of such polymer is formed from tetrafluoroethylene and perfluoro(3,6-dioxa-4-methyl-7-octene sulfonyl fluoride). Generally, this preferred polymer comprises 10 to 60 percent by weight of the perfluoro(3,6-dioxa-4-methyl-7-octene sulfonyl fluoride), and more preferably, 25 to 50 percent by weight.

Another polymer suitable for use in the membrane comprises an intermediate fluorine-containing polymer having a fluorinated hydrocarbon backbone chain to which are attached pendant side chains which carry carboxyl functional groups. The pendant side chains can contain, for example

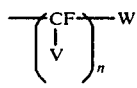

groups wherein V is F or CF₃, n is 1 to 12, and W is —COOR or —CN, where R is lower alkyl. Ordinarily, the functional group in the side chains of the polymer will be present in terminal

groups. Such polymers can be prepared from monomers which are fluorinated or fluorine substituted vinyl compounds. The polymers are usually made from at least two monomers. At least one monomer is a fluorinated vinyl compound from the first group described hereinabove in reference to polymers containing sulfonyl groups. Additionally, at least one monomer is a fluorinated monomer which contains a group which can be hydrolyzed to a carboxylic acid group, e.g., a carboalkoxy or nitrile group, in a side chain as set forth above.

A preferred class of polymers has the repeating units

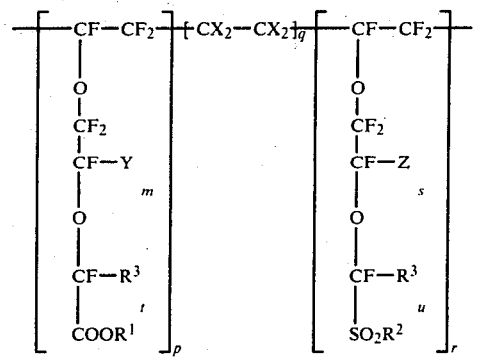

wherein
m is 0, 1 or 2,
p is 0 to 10,
q is 3 to 15,
r is 0 to 10,
s is 0, 1, 2 or 3
t is 1, 2 or 3
u is 1 or 2
the X's taken together are four fluorines or three fluorines and one chlorine,
Y is F or CF₃,
Z is F or CF₃,
R¹ is lower alkyl,
R² is F or Cl and
R³ is F, Cl or a C₁ to C₁₀ perfluoroalkyl radical,
with the proviso that at least one of p and r is at least 1.

Polymers containing carboxyl functional groups, or both carboxyl and sulfonyl functional groups, and their preparation, are described for example in British Pat. No. 1,145,445, U.S. Pat. Nos. 3,506,635 and 3,852,326, South African Pat. Nos. 78/2221 and 78/2223 and Japanese Patent Publications 38486/77 and 28586/77.

Preferred intermediate carboxyl-containing polymers include copolymers of tetrafluoroethylene and

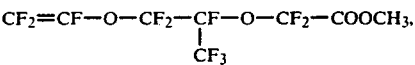

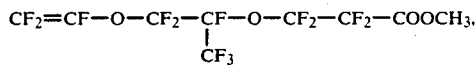

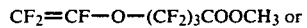

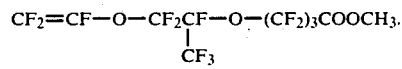

Generally, such copolymers will contain 10 to 65% by weight, preferably 25 to 50% by weight, of the carboxyl-containing monomer.

It is also possible to use a blend of two or more polymers, such as a blend of a polymer having sulfonyl functionality with a polymer having carboxyl functionality. The blends may also optionally include an inert polymer such as a copolymer of tetrafluoroethylene and perfluoropropylene, sometimes termed fluoroethylene-propylene polymers and well known in the art.

The reinforcement fabric for embedment in the membrane can be either woven or unwoven, although a woven fabric is preferred. The individual fibers of the fabric should be able to withstand a temperature from about 150° C. to about 350° C., since these temperatures are employed in the laminating steps. With this proviso, the individual reinforcing fibers can be made from conventional materials, since their main purpose is to strengthen the membrane. Due to chemical inertness, reinforcement materials made from perfluorinated polymers have been found to be preferred. The polymers include those made from tetrafluoroethylene and copolymers of tetrafluoroethylene with hexafluoropropylene and perfluoro(alkyl vinyl ethers) with alkyl being 1 to 10 carbon atoms such as perfluoro(propyl vinyl ether). An example of a most preferred reinforcement material is polytetrafluoroethylene. Supporting fibers made from chlorotrifluoroethylene polymers are also useful. Other suitable reinforcing materials include quartz and glass. Such reinforcement fibers and their use to strengthen polymers in a membrane are well known in the prior art.

In the procedure of embedding the reinforcement fabric within the membrane, a first or initial lamination step is employed. First surfaces of both an intermediate polymer film and a reinforcement fabric are laminated to one another at an elevated temperature of from about 240° C. to about 320° C., preferably about 260° C. to 290° C. At such temperature the intermediate polymer film functions to partially embed the reinforcement fabric. A second and opposite surface portion of the fabric surface does not contact the intermediate polymer film and is not embedded therein. During such lamination, a support material serves to support the reinforcement fabric which in turn supports the intermediate polymer film. At elevated temperature, a first surface of the film is laminated to a first surface of the fabric. In the lamination both first surfaces are forced together so that a portion of the first surface of the film also contacts the support material. The film follows surface contours of the fabric and contacts the support material between fiber interstices.

It is a requirement in the present process that prior to a second laminating step, holes, i.e., perforations, are formed in the first film of intermediate polymer which partially embeds the reinforcement fabric. A portion of these holes can be introduced during the first lamination. Preferably these holes are formed subsequent to this step by separation of the reinforcement fabric from the support material. A portion of the first surface of intermediate polymer film contacts and adheres to this support surface. Separation of the reinforcement fabric from the support material causes hole formation. The greater the contact and adherence of the first film to the support surface, the greater the tendency for holes to form in the first film. Another major consideration for determining the area in which hole formation takes place is the thickness of the first intermediate polymer film. This polymer film generally has a thickness from 0.5 to 5 mils and preferably from 1 to 3 mils. Other considerations determining the total area of holes in the film in which no polymer is present include the size, number and spacing of the reinforcing fibers. Generally, the film after lamination will contain holes in which no polymer is present in an area at least 5 percent of the overall surface area of the film (i.e., on a basis of both the polymer area and hole area), preferably at least 10 percent, and more preferably at least 20 percent.

After the initial step of lamination of a first film of intermediate polymer to a reinforcement fabric, a second lamination is necessary. At an elevated temperature of from about 150° C. to about 350° C., preferably about 180° C. to 290° C., a second intermediate polymer film is laminated to a second (i.e., upper) surface of the reinforcement fabric and the first intermediate polymer film (to its first surface). The reinforcement fabric becomes sandwiched between the first and second intermediate films and is embedded in these films. The second intermediate polymer film covers the first film in areas which have become perforated to form a membrane substantially free of holes. It is understood that "substantially free of holes" also includes "free of holes" since a membrane without holes is preferred. The second film of intermediate polymer generally is present in a thickness from 0.5 to 10 mils, and preferably from 1 to 5 mils. A thicker film can be employed but causes formation of a membrane with an increased thickness.

The reinforcement fabric contacts the first and second films in separate laminating steps with these materials forced together, e.g., by use of pressure rolls. It is a requirement in the present invention that the first and second films are contacted with the reinforcement fabric in two separate steps rather than simultaneously. Embedment of the reinforcing fabric in one lamination step is avoided in the practice of the present invention.

In a preferred mode of lamination, the reinforcement fabric is supported on a porous support material (e.g., porous support paper described in U.S. Pat. No. 3,770,567) between a vacuum source and a first intermediate polymer film. At elevated temperature an applied vacuum (causing a pressure differential of at least 5 mm mercury) pulls the first film down onto the reinforcement fabric and pulls a portion of the first film into contact with the porous support material.

After this laminating step in which the reinforcement fabric is partially embedded, both the reinforcement fabric and film are separated from the support paper. This separation causes holes to form in the polymer film.

In a second lamination step, a vacuum source is also employed. In relationship to this source, the first film and partially embedded reinforcement fabric are reversed from the first lamination step. The first film is supported and contacts porous support paper. A second intermediate polymer film is contacted with the partially embedded reinforcing fabric and the first polymer film. Applied vacuum (causing a pressure differential of at least 5 mm mercury) pulls the second film onto the reinforcement fabric and onto the first film to cause embedment of the reinforcement fabric. The holes in the first film allow the vacuum to pull the second film against the reinforcement fabric and the first film. The second film covers the perforations of the first film and allows formation of a membrane substantially free of holes.

The laminate, i.e., membrane, from the first and second lamination steps has reinforcement fabric embedded in a matrix of polymer. Generally films not less than 0.5 mil are employed in the first and second lamination steps.

The laminate, i.e., membrane from a first and second lamination steps, has thin wall portions, which means that the overall thickness of the membrane will vary in its different sections. This difference is due, at least in part, to the reinforcement fabric adding bulk to the membrane.

Also, due to the lamination procedure, holes are formed in a first polymer film prior to a second lamination step. This technique allows a matrix of polymer in which the reinforcement fabric is embedded to have different thicknesses. Solely on basis of thickness of polymer, the membrane, in a preferred mode, has portions of greater thickness where reinforcement fabric is present in comparison to portions where no reinforcement fiber is present.

After formation of the membrane, the intermediate polymer of the membrane is chemically converted to a cation exchange polymer. The same configuration of the resulting cation permeable membrane remains in comparison to the membrane containing intermediate polymer. Therefore, the preceding remarks (directed to the membrane containing intermediate polymer) remains in relationship to the cation permeable membrane. The chemical conversion is by reacting sulfonyl groups in the polymer which are present as $-SO_2F$ or $-SO_2Cl$, preferably $-SO_2F$, to cation exchange groups. Examples of cation exchange groups include $-(SO_2NH_2)_mQ$ where Q is H and cation of an alkali or an alkaline earth metal and m is the valence of Q, and $-(SO_3)_nMe$ wherein Me is a cation and n is the valence of Me. Another type of ion exchange group can be formed by reaction of the sulfonyl groups in the intermediate polymer with a primary amine to form N-monosubstituted sulfonamide groups. The same or different layers of the membrane can have different cation exchange groups. Conversion of sulfonyl groups to ion exchange groups or sites are disclosed in U.S. Pat. Nos. 3,282,875; 3,718,627; 3,773,634; 3,909,378; German OS 2,437,395 and OS 2,447,540.

At the same time, the carboxyl functional groups in $-COOR$ form where R is lower alkyl, generally $C_1$ to $C_5$ alkyl, or in $-CN$ form, are hydrolyzed to $-COOH$ groups. Such conversion is ordinarily and conveniently accomplished by hydrolysis with acid or base, such that the various functional groups described above in relation to the intermediate polymers are converted respectively to the free acids or the alkali metal salts thereof. Such hydrolysis can be carried out with an aqueous solution of a mineral acid or an alkali metal hydroxide. Base hydrolysis is preferred as it is faster and more complete. Use of hot solutions, such as near the boiling point of the solution, is preferred for rapid hydrolysis. The time required for hydrolysis increases with the thickness of the structure. It is also of advantage to include a water-miscible organic compound such as dimethylsulfoxide in the hydrolysis bath.

The cation exchange membrane so made has reinforcement fabric embedded therein. The membrane will have thin wall construction, meaning the membrane will have different thickness, particularly less overall thickness where no reinforcement fibers are present.

Although the reinforcement fabric is embedded in a matrix of ion exchange polymer, it is understood that the composition of the matrix does not have to be uniform. Preferably the polymer differs on opposite surface portions of the reinforcement fabric. In the first laminate procedure, an intermediate polymer is employed which can differ from the intermediate polymer of the second lamination step. This difference in the polymer matrix remains after conversion of sulfonyl and carboxyl groups in the intermediate polymers into ion exchange groups. To describe this difference in polymer matrix in the cation exchange membrane, the term "base polymer" is employed and means a polymer which in characterization any cation exchange groups are ignored. For purposes of illustration two polymers derived from the same comonomers but with different equivalent weights (containing either the same or different cation exchange groups) are different base polymers; two polymers which differ only in the type of cation exchange groups are the same base polymer. In a preferred cation exchange membrane, different base polymers contact opposite sides of the reinforcement fabric.

In accordance to the preceding definition of base polymer, the cation exchange membranes disclosed in U.S. Pat. Nos. 3,770,567; 3,849,243; 3,902,947 and 3,925,135 do not directly disclose different base polymers on opposite sides of the reinforcement fabric.

The membranes formed by the present invention when present as a cation permeable membrane have utility in membrane ion exchange devices, reverse osmosis devices or in electrolytic cells such as chlor-alkali cells. These membranes have the advantage that the reinforcement fabric is embedded in the membrane while at the same time the thickness of the membrane will be a different and thinner construction in some of the portions of the membrane where no reinforcing fabric is present. The presence of areas of thinner wall construction means less polymer need be present in the membrane in comparison with other types of cation permeable membranes containing reinforcement fibers embedded therein. Also in some uses of the cation permeable membrane, e.g., as a separator in a chlor-alkali cell, it is preferred to employ thin membranes since the electrical resistance can increase as the thickness of the membrane increases. The presence of thin wall areas in a reinforced membrane can translate into reduced power consumption in operation of an electrolytic cell. It is understood that a cation exchange membrane for this type of use is preferably perfluorinated.

Although the present process has been described in laminating two films to a reinforcement fabric, it is understood that various alternate embodiments are intended to be encompassed by this invention. For example, in the second laminating step, several films can be simultaneously laminated to the product from the first lamination. Also cation exchange groups can be present in a layer of polymer film undergoing lamination provided sulfonyl groups present as $-SO_2F$ or $-SO_2Cl$ or carboxyl groups present as $-COOR$ or $-CN$ groups are on the surface of the polymer films undergoing lamination.

In regard to the fluorinated carboxylate esters referred to herein, the term "perfluorinated" refers to the carboxylic acid portion of the ester, and not to the R group derived from a hydrocarbon alcohol. Such esters are referred to herein as perfluorinated, inasmuch as the R group is lost during hydrolysis when the ester groups are hydrolyzed to carboxylic acid groups.

The following examples are provided to illustrate the invention. In these examples equivalent weight (EW) of an intermediate polymer is given and is weight of a polymer in grams of one equivalent of potential ion exchange capacity. All percentages are by weight unless otherwise indicated.

EXAMPLE 1

The laminating equipment employed comprised a hollow roll with an internal heater and an internal vacuum source. The hollow roll contained a series of circumferential slots on its surface which allowed the internal vacuum source to draw web or sheet feed materials in the direction of the hollow roll. A curved stationary plate with a radiant heater faced the top surface of the hollow roll with a spacing of about ¼ inch between their two surfaces.

As a portion of the laminating equipment, porous support paper was used in contacting the hollow roll as a support material to prevent adherence of polymer film to the roll surface and to allow vacuum to pull material being laminated in the direction of the hollow roll. Also, the support paper allowed openings to be formed in a polymer film in a first lamination step. Feed and takeoff means were provided for the materials being laminated. In the feed means one idler roll of smaller diameter than the hollow roll was provided for support paper and materials undergoing lamination. The feed and takeoff means were positioned to allow feed material to pass around the hollow roll over a distance of about 5/6 of its circumference. A further idler roll was provided for the support paper allowing its separation from the other materials undergoing lamination. Takeoff means were provided for the support paper and a laminate.

In formation of a laminate, a support paper of 90-pound weight basis manufactured by Water Vliet Company, designated "Hi-Sette Enamel", black printed on one side with Inmont Flexolume Black No. 61-R-5589 was employed. This support paper had a minimum porosity specification of 0.006 S.C.F.M. per square inch under an air pressure differential of 40 cm of mercury. Also employed was a reinforcement fabric of T 900 G Teflon ® polytetrafluoroethylene/rayon fabric having 14 polytetrafluoroethylene treads/inch (200 denier each) and 56 rayon threads/inch (50 denier each) woven in a plain weave and a 2-mil film of a polymer of tetrafluoroethylene and perfluoro (3,6-dioxa-4-methyl-7-octene-sulfonyl fluoride). This polymer had an equivalent weight of 1100.

In the lamination step the feed materials were fed to the hollow roll with the support paper contacting the hollow roll on its unprinted side, contacting the support paper was the reinforcement fabric and contacting this fabric was the 2-mil polymer film. Lamination speed of the feed materials was 24 inches per minute with the roll temperature controlled at 237° C. and the plate temperature controlled at 300° C. A vacuum of 24.8 inches of mercury was applied.

This lamination step caused the polymer film to contact the support paper in areas wherein no reinforcement fabric was present. In the first lamination step, separation of the support paper from the laminate of the reinforcement fabric and copolymer film caused holes to form in the polymer film in an area greater than 5 percent of the surface area of the film (on basis of film and hole areas).

For a second lamination step, support paper of the same kind was used, except the paper was sprayed with silicone oil to prevent sticking. On the silicone treated side of the support paper was contacted the laminate from the first lamination with the reinforcement fabric facing away from the support paper. On the reinforcement fabric portion of the laminate was contacted an 0.5-mil polymer film of tetrafluoroethylene and perfluoro(3,6-dioxa-4-methyl-7-octenesulfonyl fluoride) with an equivalent weight of 1600. With the support paper contacting the hollow roll, a second lamination step was performed. Lamination speed was 24 inches per minute; roll temperature was 232° C.; plate temperature was 296° C.; vacuum applied was 15 inches of mercury.

After this second lamination step and separation of the support paper, visual examination showed the laminate to be completely free of any holes.

EXAMPLE 2

A reinforced membrane was made employing the apparatus and a similar procedure described in Example 1. The procedure of this Example employed in a first lamination step a 2 mil 1100 EW (i.e., equivalent weight) film of a polymer of tetrafluoroethylene and perfluoro(3,6-dioxa-4-methyl-7-octenesulfonyl fluoride) and a reinforcement fabric of T 900 G Teflon ® polytetrafluoroethylene/rayon fabric (described in Example 1).

For the second lamination step a 5 mil 1200 EW film of a polymer of tetrafluoroethylene and perfluoro(3,6-dioxa-4-methyl-7-octenesulfonyl fluoride) was employed with one side having been contacted and reacted to a depth of 1.3 mils with n-butylamine. The unreacted side of the 5-mil film (which contains unreacted pendant —$SO_2F$ groups) was laminated in a similar procedure as the second lamination disclosed in Example 1.

The resulting laminate had virtually no leaks as determined by a vacuum operated leak detector apparatus.

Although the membrane was not converted to a cation exchange membrane, it could have been easily undertaken by reaction of the —$SO_2F$ groups, e.g., by immersion of the laminate in potassium hydroxide.

EXAMPLES 3 and 4

Employing a similar procedure as in Example 1, a 2-mil film of 1100 EW polymer of tetrafluoroethylene and perfluoro(3,6-dioxa-4-methyl-7-octenesulfonyl fluoride) and a reinforcement fabric of T 900 G Teflon ® polytetrafluoroethylene/rayon fabric were continually laminated; thereafter a 1-mil film of 1500 EW polymer of tetrafluoroethylene and perfluoro(3,6-dioxa-4-methyl-7-octenesulfonyl fluoride) was employed in a second lamination.

The resulting laminate was uniform, leak free and the reinforcement fabric was well embedded therein.

For Example 4, a similar procedure as in Example 3 was employed except in the second lamination a 1.5-mil 1500 EW polymer film was used (in place of the 1 mil 1500 EW polymer film).

The two laminates of Examples 3 and 4 were totally hydrolyzed by immersion in 11% solution of potassium hydroxide in 30% aqueous dimethyl sulfoxide at 90° C. for about one hour, followed by boiling in distilled water for thirty minutes. The two membranes were leak free.

The cation exchange membranes of Examples 3 and 4 were mounted in 3-inch diameter laboratory chlor-alkali cells with the higher equivalent weight portion of the membrane facing the cathode compartment. The cells were operated at 2 amperes/$inch^2$, 80° C. and a 22–23% NaCl anolyte and after two days the following results were obtained.

|  | Product Caustic | Cell Voltage | Efficiency |
| --- | --- | --- | --- |
| Example 3 | 3.25 N | 3.6 | 86% |
| Example 4 | 3.25 N | 3.8 | 88% |

EXAMPLE 5

A reinforced membrane was made employing the apparatus and a similar procedure described in Example 1. The procedure of this example employed in the first lamination step a 2-mil film of a copolymer of 40.5% by wt. tetrafluoroethylene and 59.5% by wt. perfluoro(3,6-dioxa-4-methyl-7-octenesulfonyl fluoride) having an equivalent weight of 1100, and a calendered leno weave fabric having 200-denier polytetrafluoroethylene yarn in the warp and 400-denier polytetrafluoroethylene yarn in the fill (fabric designation T-24C).

For the second lamination step a 5-mil film of a copolymer of 37% by wt. of tetrafluoroethylene and 63 wt. of

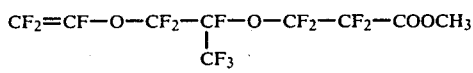

having an equivalent weight of 1149 was employed. In this step a speed of 24 inches/min was used with the vacuum roll at 220° C. and the curved plate at 278° C., and the support paper was a porous silicone-coated paper (Partwick #3300 manufactured by the Paper Corporation of United States). The resulting laminate was uniform and leak-free. The fabric was well embedded therein.

The laminate was converted to an ion exchange membrane having —SO₃H groups in one layer and —COOH groups in the other layer by immersion in a hydrolysis bath of 13% potassium hydroxide in 30% aqueous dimethyl sulfoxide at 90° C. for 1 hour, followed by boiling in distilled water for 30 minutes. The membrane was free of leaks.

The membrane was mounted in a chloralkali cell with the carboxyl side of the membrane facing the cathode compartment, and was tested under conditions specified in Examples 3 and 4. Representative test data are as follows:

| Days | Voltage | NaOH % | Current Efficiency |
|------|---------|--------|--------------------|
| 1    | 4.55    | 32.20  | 90.7               |
| 9    | 4.22    | 29.37  | 94.6               |
| 36   | 4.48    | 35.27  | 89.1               |
| 57   | 4.20    | 35.98  | 87.7               |
| 76   | 4.87    | 35.90  | 83.6               |
| 104  | 4.73    | 30.73  | 85.2               |
| 125  | 4.43    | 32.80  | 84.9               |

EXAMPLE 6

A reinforced membrane was made employing the apparatus and a similar procedure described in Example 1. The procedure of this example employed in the first lamination step a 2-mil film of a copolymer of 40% by wt. of tetrafluoroethylene and 60% by wt. of

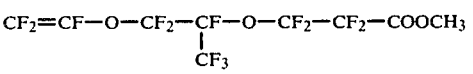

having an equivalent weight of 1052 and T-24C fabric (described in Example 5). In this step the lamination was at a speed of 12 inches/min, with the vacuum roll at 200° C. and the curved plate at 225° C., and the support paper Partwick #3300.

For the second lamination step a 5-mil film of the same 1052-equivalent weight carboxyl polymer described in the first paragraph of this example was employed. The lamination was carried out as in the first step of this example except at a speed of 24 inches/min. The resulting laminate was free of leaks and the fabric was well embedded therein.

The laminate was converted to an ion exchange membrane having carboxylic acid groups in both layers by hydrolysis and washing as described in Example 5.

The membrane was tested in a chloralkali cell under conditions specified in Examples 3 and 4. Representative test data are as follows.

| Days | Voltage | NaOH % | Current Efficiency % |
|------|---------|--------|----------------------|
| 1    | 4.50    | 27.69  | 88.8                 |
| 6    | 4.59    | 29.41  | 91.1                 |
| 15   | 4.62    | 30.23  | 89.4                 |
| 38   | 4.69    | 29.02  | 91.3                 |
| 56   | 4.70    | 30.91  | 89.5                 |
| 69   | 4.75    | 30.77  | 94.1                 |
| 99   | 5.15    | 37.84  | 84.6                 |
| 122  | 5.10    | 35.50  | 86.7                 |
| 139  | 5.06    | 36.31  | 84.1                 |
| 148  | 4.94    | 31.92  | 89.5                 |
| 171  | 4.83    | 26.64  | 89.2                 |

INDUSTRIAL APPLICABILITY

The process of the invention provides a membrane which, after conversion to ion exchange form, is useful for various ion exchange purposes, such as packing for ion exchange devices, reverse osomosis, and as membrane for separating the compartments of various electrochemical cells which comprise in general an anode, a cathode, an anode compartment and a cathode compartment. The ion exchange membrane is particularly useful for the membrane of a chloralkali cell.

What is claimed is:

1. A process for making a reinforced membrane comprising the steps of:

(a) laminating at a temperature from about 150° C. to about 350° C. first surfaces of both a first film and a reinforcement fabric, wherein said reinforcement fabric contacts a porous support material and during laminating, a vacuum causing a pressure differential of at least 5 mm Hg, draws the first surface of the reinforcement fabric and forces a portion of the first surface of the first film into contact with said porous support material;

said film comprising a fluorine-containing polymer with pendant side chains comprising sulfonyl groups present as —SO₂F or —SO₂Cl, or carboxyl groups present as —COOR where R is lower alkyl, or —CN groups, each of said sulfonyl or carboxyl groups attached to a carbon atom which has at least one fluorine atom connected thereto;

(b) separating said reinforcement fabric and said first film from said porous support material whereby a laminate is obtained with holes in an area at least 5% of an overall surface area of said film;

(c) laminating at a temperature from about 150° C. to 350° C. a second film with (i) the first surface of said first film, and (ii) a second surface of said reinforcement fabric, and during laminating a vacuum causing a pressure differential of at least 5 mm Hg draws the second film onto (i) and (ii), said second film comprising a fluorine-containing polymer with pendant side chains comprising sulfonyl groups present as —SO₂F or —SO₂Cl, or carboxyl groups present as —COOR where R is lower alkyl, or —CN groups, each of said sulfonyl or carboxyl groups attached to a carbon atom which has at least one fluorine atom connected thereto, causing embedment of said fabric in a matrix of at least one said fluorine-containing polymer and causing formation of a membrane substantially free of holes.

2. The process of claim 1 wherein in (a) and (c) said temperature is from about 180° C. to 290° C.

3. The process of claim 1 wherein in (a) and (b) said holes are formed in an area of at least 10% of the overall surface area of the first film.

4. The process of claim 3 wherein in (a) and (b) said holes are formed in an area of at least 20% of the overall surface area of the first film.

5. The process of claim 1 wherein said first film has a thickness from 0.5 to 5 mils.

6. The process of claim 5 wherein said first film has a thickness from 1 to 3 mils.

7. The process of claim 5 wherein said second film has a thickness from 0.5 to 10 mils.

8. The process of claim 7 wherein said second film has a thickness from 1 to 5 mils.

9. The process of claim 1 wherein said reinforcement fabric is woven.

10. The process of claim 1 wherein in (a) and (c) any said sulfonyl groups are present as —SO₂F, and any said carboxyl groups are present as —COOR.

11. The process of claim 1 wherein in (a) and (c), said polymer is perfluorinated.

12. The process of claim 11 wherein in (a) and (c), said polymer is a copolymer of tetrafluoroethylene and perfluoro(3,6-dioxa-4-methyl-7-octenesulfonyl fluoride).

13. The process of claim 11 wherein in at least one of steps (a) and (c), said polymer is a copolymer of tetrafluoroethylene and

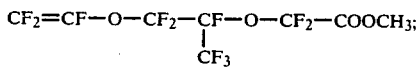

CF₂=CF—O—(CF₂)₃COOCH₃ or

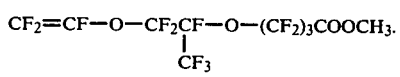

14. The process of claim 11 wherein in at least one of steps (a) and (c), said polymer is a copolymer of tetrafluoroethylene and

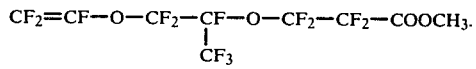

15. The process of claim 1 wherein in step (c) said second film is a combination of a first layer of fluorine-containing polymer with pendant side chains comprising sulfonyl groups present as —SO₂F or —SO₂Cl in non-adherent contact with a second layer of fluorine-containing polymer with pendant side chains comprising carboxyl groups present as —COOR where R is lower alkyl, said second film disposed so that said first layer contacts said reinforcing fabric and said first film.

16. The process of claim 1 wherein said membrane of (c) is free of holes.

17. The process of claim 1 wherein said membrane of (c) is converted into a cation exchange membrane by conversion of said sulfonyl groups present as —SO₂F or —SO₂Cl to form cation exchange groups, and of said carboxyl groups present as —COOR or —CN into —COOH groups or Na or K salt thereof.

18. The cation exchange membrane made by the process of claim 17.

19. The cation exchange membrane of claim 18 wherein opposite surfaces of the reinforcement fabric contact different base polymers.

20. The cation exchange membrane of claim 19 wherein said base polymers have different equivalent weights.

21. The cation exchange membrane of claim 19 wherein said base polymers contain different cation exchange groups.

22. The cation exchange membrane of claim 18 wherein said matrix of at least one fluorine-containing polymer is perfluorinated.

23. The cation exchange membrane of claim 22 wherein at least one layer of said matrix of at least one fluorine-containing polymer is formed from a polymer of tetrafluoroethylene and perfluoro(3,6-dioxa-4-methyl-7-octenesulfonyl fluoride).

24. The cation exchange membrane of claim 22 wherein at least one layer of said matrix of at least one fluorine-containing polymer is formed from a copolymer of tetrafluoroethylene and

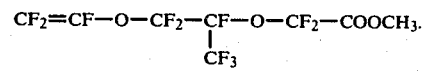

25. The cation exchange membrane of claim 22 wherein at least one layer of said matrix of at least one fluorine-containing polymer is formed from a polymer of tetrafluoroethylene and

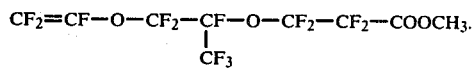

26. The cation exchange membrane of claim 22 wherein at least one layer of said matrix of at least one fluorine-containing polymer is formed from a copolymer of tetrafluoroethylene and CF₂=CF—O—(CF₂)₃COOCH₃.

27. The cation exchange membrane of claim 22 wherein at least one layer of said matrix of at least one fluorine-containing polymer is formed from a polymer of tetrafluoroethylene and

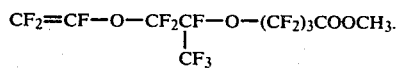

28. The cation exchange membrane of claim 18 wherein said matrix consists of first, second and third layers, said second layer being between and in adherent contact with said first and third layers, said first layer being formed from a said fluorine-containing polymer with pendant side chains comprising carboxyl groups present as —COOR, said second layer being formed from a said fluorine-containing polymer with pendant side chains comprising sulfonyl groups present as —SO$_2$F, said third layer being formed from a said fluorine-containing polymer with pendant side chains comprising sulfonyl groups present as —SO$_2$F, and reinforcement fabric embedded at least predominantly in said second and third layers.

29. The cation exchange membrane of claim 18 where said reinforcement fabric is woven.

30. The cation exchange membrane of claim 18 which is free of holes.

31. An electrochemical cell which comprises an anode compartment, an anode situated within said anode compartment, a cathode compartment, a cathode situated within said cathode compartment, and, between said compartments, said membrane of claim 18.

32. In a process for electrolysis of brine in a chloralkali cell which comprises an anode, an anode compartment, a cathode, a cathode compartment, and a fluorine-containing cation exchange membrane which separates said compartments, to form caustic and chlorine, the improvement which comprises employing as said membrane the membrane of claim 18.

* * * * *